United States Patent
Jwa

(10) Patent No.: US 7,548,522 B2
(45) Date of Patent: Jun. 16, 2009

(54) ORTHOGONAL FREQUENCY DIVISION MULTIPLEXING WIRELESS COMMUNICATION OPERABLE ON FREQUENCY SELECTIVE CHANNEL, AND CHANNEL COMPENSATION METHOD

(75) Inventor: Jeong-Woo Jwa, Jeju (KR)

(73) Assignee: KTFreetel Co., Ltd., Seoul (KR)

( * ) Notice: Subject to any disclaimer, the term of this patent is extended or adjusted under 35 U.S.C. 154(b) by 793 days.

(21) Appl. No.: 10/720,701

(22) Filed: Nov. 24, 2003

(65) Prior Publication Data
US 2005/0073948 A1 Apr. 7, 2005

(30) Foreign Application Priority Data
Mar. 27, 2003 (KR) .............. 10-2003-0019201
May 2, 2003 (KR) .............. 10-2003-0028227

(51) Int. Cl.
*H04W 4/00* (2006.01)

(52) U.S. Cl. .............. 370/330; 370/208; 370/210; 455/102

(58) Field of Classification Search .............. 370/210, 370/343, 208, 503, 513, 358, 203; 455/102, 455/103, 562.1; 375/260, 316, 340, 344, 375/326, 342, 346; 714/727
See application file for complete search history.

(56) References Cited

U.S. PATENT DOCUMENTS

| 5,471,464 | A * | 11/1995 | Ikeda ............... 370/203 |
| 5,652,772 | A | 7/1997 | Isaksson et al. |
| 6,028,900 | A * | 2/2000 | Taura et al. ............... 375/344 |
| 7,068,981 | B2 * | 6/2006 | Sim ............... 455/101 |
| 2003/0012126 | A1 * | 1/2003 | Sudo ............... 370/203 |
| 2003/0053412 | A1 * | 3/2003 | Yoshida et al. ............ 370/208 |
| 2004/0042385 | A1 * | 3/2004 | Kim et al. ............... 370/203 |
| 2004/0047284 | A1 * | 3/2004 | Eidson ............... 370/203 |
| 2005/0163238 | A1 * | 7/2005 | Fujii ............... 375/260 |
| 2005/0207334 | A1 * | 9/2005 | Hadad ............... 370/203 |
| 2005/0276254 | A1 * | 12/2005 | Zhang ............... 370/343 |
| 2006/0104195 | A1 * | 5/2006 | Nakahara et al. ............ 370/203 |
| 2007/0157058 | A1 * | 7/2007 | Park et al. ............... 714/727 |

FOREIGN PATENT DOCUMENTS

| KR | 1020010064281 | 7/2001 |
| WO | WO 98/09395 | 3/1998 |
| WO | WO 02/093859 A1 | 11/2002 |

OTHER PUBLICATIONS

Miller et al., "Peak Power and Bandwidth Efficient Linear Modulation", IEEE, Dec. 1998, vol. 46, pp. 1639-1648.*
EP Search Report for EP Application No. 03028180.2 dated Jan. 19, 2007.

* cited by examiner

*Primary Examiner*—Donald L Mills
(74) *Attorney, Agent, or Firm*—Alston & Bird LLP

(57) ABSTRACT

Disclosed is an OFDM (orthogonal frequency division multiplexing) wireless communication system operable on a frequency selective channel, and a channel compensation method. An IDFT (inverse discrete Fourier transform) unit of a transmitter includes first through third N-point IDFT units, and performs IDFT on a binary information signal twice. A DFT (discrete Fourier transform) unit of a receiver includes first through third N-point DFT units, a channel predictor and interpolator, and a channel compensator, and performs DFT on the signal received from the transmitter twice.

11 Claims, 8 Drawing Sheets

(a) 20Hz (b) 100Hz

ORTHOGONAL FREQUENCY DIVISION MULTIPLEXING WIRELESS COMMUNICATION OPERABLE ON FREQUENCY SELECTIVE CHANNEL, AND CHANNEL COMPENSATION METHOD

CROSS REFERENCE TO RELATED APPLICATION

This application claims priority to and the benefit of Korea Patent Applications No. 2003-19201 filed on Mar. 27, 2003 and No. 2003-28227 filed on May 2, 2003 in the Korean Intellectual Property Office, the content of which is incorporated herein by reference.

BACKGROUND OF THE INVENTION (a) Field of the Invention

The present invention relates to an OFDM (orthogonal frequency division multiplexing) wireless communication system operable on a frequency-selective channel. More specifically, the present invention relates to a channel compensation system and method thereof.

(b) Description of the Related Art

Recently, OFDM methods, which are digital modulation methods for improving data rates per communication bandwidth and preventing interference caused by a multipath fading channel, have been widely used for communication methods for providing mobile multimedia services.

For example, the OFDM methods are adopted for cable communication methods of the ADSL and VDSL systems, used for radio standards of digital audio broadcasting and digital video terrestrial broadcasting, and in addition, they are standardized as IEEE802.11a and 802.16 for W-LAN communication methods of from 2.4 to 5 GHz.

When transmitting high-rate data through a mobile channel in the above-noted OFDM system, the mobile channel is modeled as a frequency selective fading channel, and this kind of the OFDM wireless communication system adds a guard interval obtained from a cyclic extension to an OFDM signal and transmits them so as to solve inter-symbol interference caused by a delay spread of the frequency selective fading channel.

In detail, the conventional OFDM wireless communication system provides an IDFT (inverse discrete Fourier transform) unit and a DFT (discrete Fourier transform) for data modulation and demodulation to a transmitter and a receiver. When the receiver receives a signal from the transmitter, and demodulates the signal by using the DFT unit, the demodulated frequency selective fading channel signal is represented in a product format of a transmit signal. Through this, a channel predictor of the receiver predicts an amplitude and a phase of the channel represented in the product format by using a pilot symbol, and performs channel compensation by using the predicted amplitude and the phase of the channel. That is, the channel compensation is performed by multiplying the demodulated OFDM signal by a complex conjugate that is a channel predict value, which executes channel compensation more simply and easily than the conventional channel compensation following a convolutional operation.

However, the conventional channel compensation method is of no consideration in a case when the amplitude of the channel steeply reduces, and lowers the total performance caused by generation of burst errors. Further, the channel compensation method increases BER (bit error rates) and allows low data rates.

A single carrier communication system uses results of the channel predictor to perform channel compensation so as to compensate the frequency selective fading channel, but this channel compensation method has a demerit of using a channel predictor and a complex equalizer.

Therefore, a channel compensation system and method for reducing the BER of an interval with a narrow channel amplitude in the OFDM wireless communication system is required.

SUMMARY OF THE INVENTION

It is an advantage of the present invention to provide an OFDM wireless communication system operable on a frequency selectable channel for reducing BER in an interval with a narrow channel amplitude and improving total error rates, and a channel compensation method thereof.

It is another advantage of the present invention to provide an OFDM wireless communication system operable on a frequency selectable channel for at least doubling data rates, and obtaining higher economy with respect to investment with the same frequency, and a channel compensation method thereof.

In one aspect of the present invention, in a wireless communication system for transmitting and receiving data by using a multipath fading channel, an OFDM wireless communication system comprises: a transmitter for performing IDFT on an information transmit vector at least twice to modulate it into an OFDM signal, transmitting the modulated OFDM signal through a multipath fading channel, modulating a pilot symbol vector for predicting an amplitude and a phase of the multipath fading channel into an OFDM signal, and transmitting the modulated OFDM signal through the multipath fading channel; and a receiver for demodulating the pilot symbol vector received through the multipath fading channel to predict the amplitude and the phase of the multipath fading channel, using the predicted amplitude and phase to compensate the amplitude and the phase multiplied to the received information transmit vector, performing DFT on the compensated information transmit vector to average a noise signal value increased by the channel compensation in a specific interval with an amplitude of the channel with less than a mean value into a mean value within an OFDM symbol interval, and outputting the mean value.

In another aspect of the present invention, a wireless communication system including a transmitter for transmitting data using a multipath fading channel and a receiver for receiving them from the transmitter, comprises: a mapper for mapping an externally received binary information sequence to at least one symbol according to the MQAM (M-ary quadrature amplitude modulation) method; a serial to parallel converter for converting the mapped symbols into vector data which are information transmit vectors; a first IDFT unit including at least one (preferably M) IDFT unit for performing IDFT on the converted information transmit vectors; an interleaver for writing subchannel values of the respective transmit vectors received from the IDFT unit in an M×N memory buffer in the first direction; a second IDFT unit including at least one (preferably M) IDFT unit for reading the subchannel values written in the first direction in the second direction when the writing in the first direction is finished, performing IDFT on the read subchannel values, and modulating them to OFDM signals; a third IDFT unit for modulating a pilot symbol vector for predicting an amplitude and a phase of the multipath fading channel to an OFDM signal; and a parallel to serial converter and guard interval inserter for inserting a guard interval into the signal received from the second IDFT unit, converting the guard interval inserted information transmit vector into a serial signal and transmitting the serial signal, and converting the guard interval inserted pilot symbol vector into a serial signal and transmitting it to the transmitter.

The wireless communication system further comprises: a guard interval eliminator and serial to parallel converter for eliminating the guard interval from the converted and received serial signal, and converting the guard interval eliminated serial signal into an information transmit vector and a pilot symbol vector respectively; a first DFT unit including at least one DFT unit for demodulating the converted information transmit vector into an OFDM signal; a third DFT unit for demodulating the converted pilot symbol vector into an OFDM signal; a channel predictor and interpolator for predicting the amplitude and phase of the multipath fading channel using the demodulated pilot symbol vector; a channel compensator for compensating the amplitude and phase of the channel multiplied to the demodulated information transmit vector according to the predicted amplitude and phase of the channel; a deinterleaver for writing the compensated channel signals in an M×N memory buffer in the first direction; a second DFT unit including at least one (preferably M) DFT unit for reading the signal with less channel autocorrelations in the second direction from among the channel compensated signals written in the first direction, performing DFT on the read signals, and demodulating them into OFDM signals; a parallel to serial converter for converting the demodulated signals into serial signals; and a decoder for restoring the converted serial signals into a binary information sequence, and outputting the binary information sequence.

In still another aspect of the present invention, a method for compensating a channel in a wireless communication system for transmitting and receiving data using a multipath fading channel, comprises: (a) performing IDFT on a vector for information transmission to modulate the vector into an OFDM signal, and transmitting the modulated signal through the multipath fading channel; (b) modulating a pilot symbol vector for predicting an amplitude and a phase of the multipath fading channel into an OFDM signal, and transmitting the modulated signal through the multipath fading channel; (c) demodulating the pilot symbol vector received through the multipath fading channel to predict the amplitude and the phase of the multipath fading channel; (d) compensating the amplitude and the phase of the channel multiplied to the received information transmit vector by using the predicted amplitude and the phase of the channel; and (e) performing DFT on the compensated channel signal, averaging a noise signal value enhanced by the channel compensation in a specific interval with an amplitude of the channel with less than a mean value into a mean value within an OFDM symbol interval, and outputting the mean value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
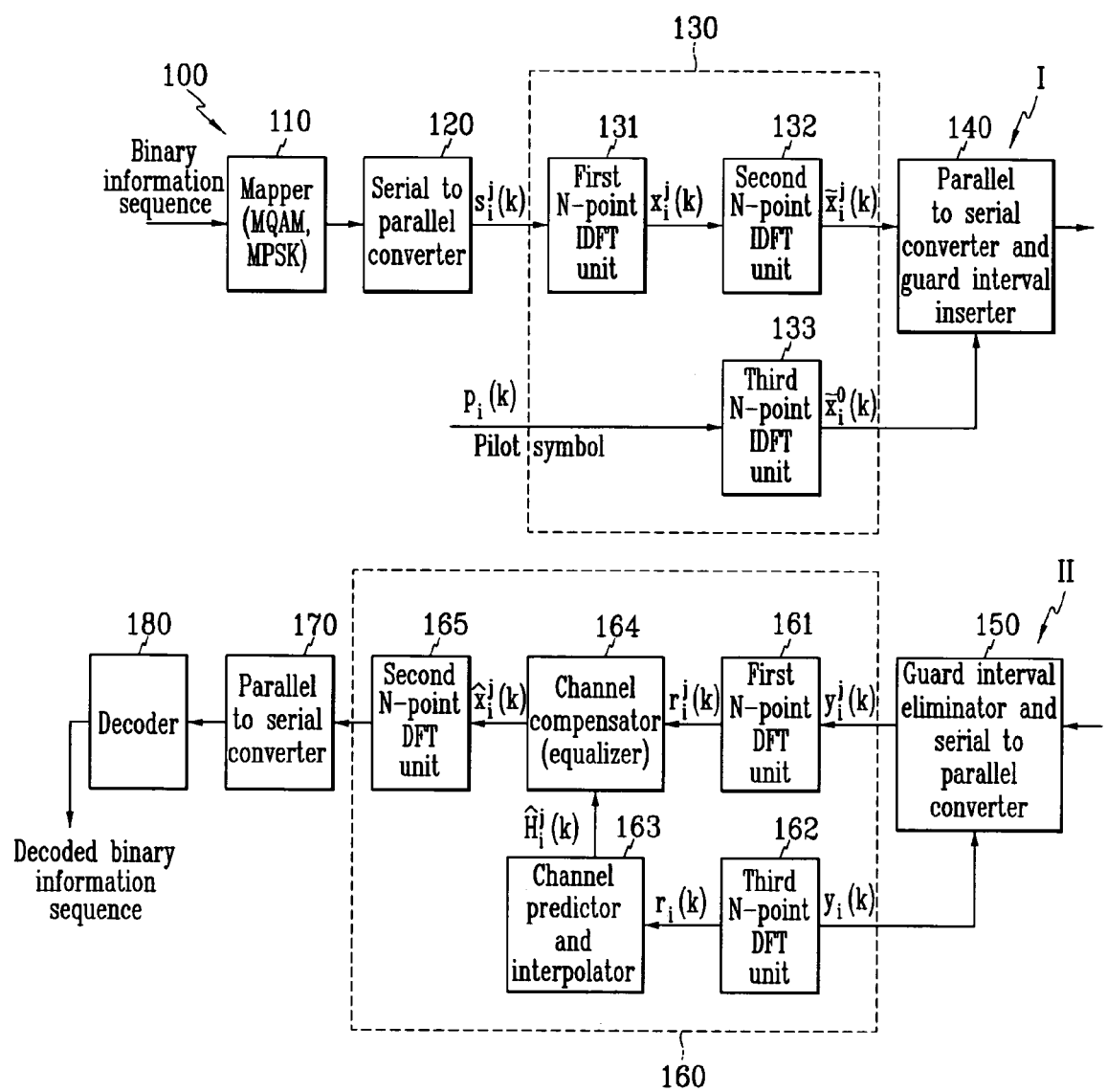
FIG. 1 shows a detailed configuration of a wireless communication system according to a first preferred embodiment of the present invention.

FIG. 1 shows a detailed configuration of a wireless communication system according to a first preferred embodiment of the present invention.

As shown, the wireless communication system 100 includes a transmitter I and a receiver II, and for ease of description, a data transmit and receive process between the transmitter I and the receiver II, that is, a baseband part which is a prior stage of an IF (intermediate frequency) conversion, will be described.

As to its detailed configuration, the transmitter I comprises a mapper 110, a serial to parallel converter 120, an IDFT (inverse discrete Fourier transform) unit 130, and a parallel to serial converter and guard interval inserter 140, and the receiver II comprises a guard interval eliminator and serial to parallel converter 150, a DFT (discrete Fourier transform) unit 160, a parallel to serial converter 170, and a decoder 180.

In order to reduce error rates in an interval with a channel amplitude below an average, the IDFT unit 130 of the transmitter I is configured to include first through third N-point IDFT units 131 through 133 to perform IDFT on an externally received signal twice.

The DFT 160 of the receiver II comprises first and third N-point DFT units 161 and 162, a channel predictor and interpolator 163, a channel compensator 164, and a second N-point DFT unit 165 to perform DFT on an information transmit signal provided from the transmitter I twice.

Respective components of the above-configured wireless communication system 100, and an operational process through the components, will now be described in detail with reference to equations.

The mapper 110 of the transmitter I maps an externally received binary information sequence to symbols according to the MQAM (M-ary quadrature amplitude sequence) or the multi-phase shift keying method.

The serial to parallel converter 120 receives mapped MQAM symbols and converts them into vector data as given in Equation 1.

$$s_i^j = (s_i^j(0), s_i^j(1), K, s_i^j(N-1))$$

Equation 1 where $s_i^j(k)$ is a normalized MQAM symbol with a mean power of 1, i and j are indexes of a pilot symbol block and represent the j-th MQAM symbol vector in the i-th pilot symbol block (including a single pilot symbol vector and (Np−1) information transmit vectors), and N is a number of subchannels (or subcarriers).

That is, a pilot symbol vector is configured by using a single pilot symbol vector and (Np−1) information transmit vectors where Np is an interval of a pilot symbol vector and represents that a single pilot symbol vector is transmitted after (Np−1) information transmit vectors are transmitted.

Next, the first and second N-point IDFT units 131 and 132 of the IDFT unit 130 modulates the MQAM symbol vector which is an information transmit vector into an OFDM signal through first and second IDFT conversion operations, and the third N-point IDFT unit 133 modulates a pilot signal for predicting the amplitude and the phase of the mobile channel into an OFDM signal.

Output signals of the second and third N-point IDFT units 132 and 133 are given as Equation 2.

$$\tilde{x}_i^j = \begin{cases} IDFT(p_i) & j = 0 \\ IDFT(IDFT(s_i^j)) & 1 \le j \le N_p - 1 \end{cases}$$

Equation 2 where the pilot symbol vector is given as Equation 3

$$p_i^j = (p_i(0), 0, K, 0, p_i(P), K, p_i(N_G P - 1), 0, K, 0)$$

Equation 3 where $p_i(P)$ is a pilot symbol with a mean power normalized to $N/N_G$ (where N is a number of pilot symbols, and $N_G$ is a number of pilot symbols in a guard interval), and P is an interval of the pilot symbol (i.e., a pilot spacing) in the pilot symbol vector. The relation of $P=N/N_G$ is found by establishing a number of pilot symbols in the pilot symbol vector to be matched with the number of pilot symbols in a guard interval.

The parallel to serial converter and guard interval inserter 140 adds the guard interval obtained by performing cyclic extension on the OFDM signal output by the second N-point IDFT unit 132 to the OFDM signal, converts the information transmit vector added with a guard interval into a serial signal to transmit (Np−1) vectors according to the above-noted pilot symbol block configuration method, and converts the pilot symbol vector added with a single guard interval into a serial signal to transmit the serial signal to an IF converter.

The transmitted signal having undergone the above process is transmitted to the receiver II through the IF converter, an RF (radio frequency) converter, and an antenna.

The guard interval eliminator and serial to parallel converter 150 of the receiver II eliminates the guard interval from the OFDM signal received from an IF demodulator, and converts the serial signal without the guard interval into vector data.

The third N-point DFT unit 162 of the DFT unit 160 demodulates an OFDM signal which is a pilot symbol vector from among the converted vector data, and the channel predictor and interpolator 163 predicts an amplitude and a phase of the fading channel multiplied to the information transmit signal from the demodulated pilot symbol.

The first N-point DFT unit 161 demodulates the information transmit vector from among the converted vector data, and the channel compensator 164 uses the channel predict value received from the channel predictor and interpolator 163 to compensate the amplitude and phase of the channel multiplied to the demodulated information transmit data.

The second N-point DFT unit 165 performs DFT on the channel compensated information transmit signal so that noise enhancement in a specific interval with a narrow channel amplitude may be averaged or smoothed to values in a general symbol interval, thereby reducing the error rates, and improving the total system performance.

The parallel to serial converter 170 converts the channel-compensated information transmit vector into a serial signal, and the decoder 180 restores the output serial signal to a binary information sequence, and outputs the binary information sequence.

A channel compensation process of the wireless communication system 100 according to the first preferred embodiment of the present invention will now be further described.

The k-th subchannel in the pilot symbol vector demodulated through the third N-point DFT unit 162 is given as Equation 4.

$$r_i(k) = H_i(k)p_i(k) + I_i(k) + W_i(k) \quad 0 \le k \le N-1$$

Equation 4 where $H_i(k)$ is a distortion signal caused by a frequency selective fading channel, $I_i(k)$ is an ICI (interchannel interference) caused by Doppler spreading, and $W_i(k)$ is an AWGN (additive white Gaussian noise) signal with a mean power of No in the frequency domain. The information transmit vector demodulated through the first N-point DFT unit 161 is given as Equation 5

$$r_i^j = DFT(y_i^j)$$

$$y_i^j = (y_i^j(0), y_i^j(1), K, y_i^j(N-1))$$

Equation 5 where $y_i^j$ is the j-th OFDM receive signal vector of the i-th pilot block.

The channel compensator 164 receives prediction values of the amplitude and phase of the channel from the channel predictor and interpolator 163, and compensates the channel using the MMSE (minimum mean square error) equalization method as shown in Equation 6.

$$\hat{x}_i^j(k) = \frac{r_i^j(k)\hat{H}_i^{j*}(k)}{\left|\hat{H}_i^{j*}(k)\right|^2 + \sigma_w^2/\sigma_x^2 + \sigma_I^2}$$

Equation 6 where $\hat{H}_i^{j*}(k)$ is a channel prediction value received from the channel predictor and interpolator 163, $\sigma_w^2$ and $\sigma_x^2$ are mean power values of the OFDM signal and the AWGN signal, and $\sigma_I^2$ is a mean power value of the ICI signal. The $\sigma_I^2$ is found from Equation 7.

$$\sigma_I^2 = 1 - \frac{1}{N^2}\left(N + 2\sum_{n=1}^{N-1}(N-n)J_0(2\pi n f_D T_s)\right)$$

Equation 7 where $f_D$ is a maximum Doppler frequency, $T_s$ is a sampling interval, and $J_0(\ )$ is a first kind of Bessel function. The ICI signal is modeled with the Gaussian noise, and transmit errors are generated without the AWGN.

The channel compensator 164 receives prediction values of the amplitude and phase of the channel from the channel predictor and interpolator 163, and compensates the channel using the ZF (zero forcing) equalization method as shown in Equation 8.

$$\hat{x}_i^j(k) = \frac{r_i^j(k)\hat{H}_i^{j*}(k)}{\left|\hat{H}_i^{j*}(k)\right|^2} \qquad \text{Equation 8}$$

Further, the channel compensator 164 receives prediction values of the amplitude and phase of the channel from the channel predictor and interpolator 163, and compensates the channel using the gain limit equalization method as given in Equation 9.

$$\hat{x}_i^j(k) = \frac{r_i^j(k)\hat{H}_i^{j*}(k)}{\left|\hat{H}_i^{j*}(k)\right|^2 + \sigma} \qquad \text{Equation 9}$$

where σ is a constant used for gain limits.

The third N-point DFT unit 162 performs the DFT on the channel compensated information transmit signal according to the equalization method to average noise enhancement in a specific interval with a narrow amplitude of the channel into values within a general symbol interval.

As described, in order to compensate the amplitude and phase of the channel by using an estimated channel prediction value in the wireless communication system 100 according to the first preferred embodiment, the channel compensator 164 compensates the channel through the MMSE equalization method, and the third N-point DFT unit 162 averages the noise enhancement in the specific interval with an amplitude of the channel with less than a mean value of the amplitudes from among the compensated channels, into values of within a general symbol interval, thereby improving the total system performance.

That is, the wireless communication system 100 reduces error rates by further performing an IDFT process and a corresponding DFT process compared to the conventional OFDM channel compensation method.

Figure 7:
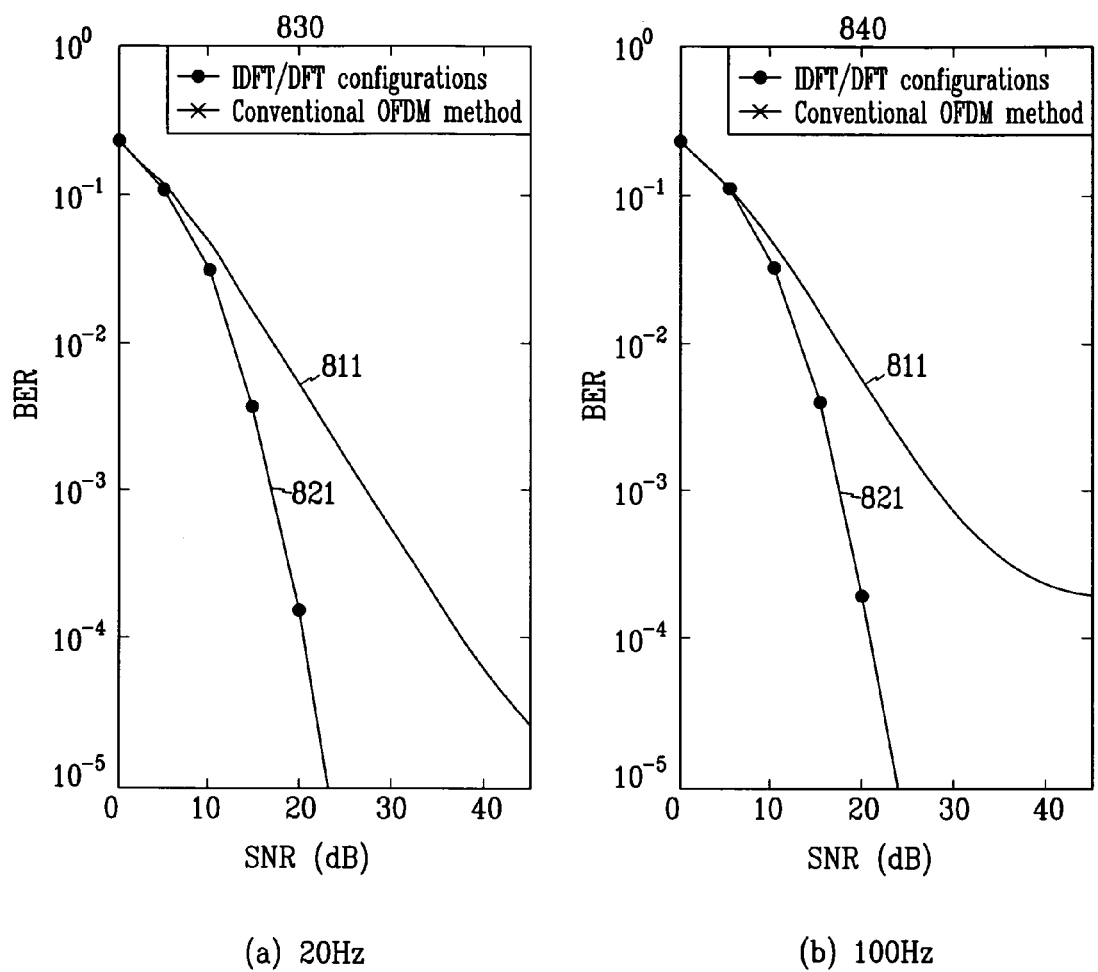
FIG. 7 shows improved BER of the wireless communication system according to a preferred embodiment of the present invention.

FIG. 7 shows improved BER of the wireless communication system according to the preferred embodiment of the present invention.

As shown in FIG. 7, the wireless communication system 100 has improved the BER by greater than 10 dB from the BER of $10^{-3}$ compared to the conventional OFDM method. Also, without using additional error correcting codes, the wireless communication system 100 has a high frequency usage efficacy of 4 bit/sec/Hz in a mobile channel environment with a maximum Doppler frequency of 100 Hz when the SNR (signal to noise ratio) is 30 dB. Hence, the data rate of 20 Mbps (when decrements caused by a guard interval and a pilot symbol are not considered) is obtained when a mobile multimedia service is provided by using a frequency bandwidth of 5 MHz. For reference, the conventional OFDM method has data rates of 10 Mbps according to the frequency efficacy of 2/bit/sec/Hz in the same condition.

Therefore, the wireless communication system according to the preferred embodiment has twice faster data rates than that of the conventional transmission method, and accordingly, obtains twice the economy with respect to investment with the same frequency.

In order to additionally improve the system performance of the wireless communication system of the first preferred embodiment when a processing delay is allowed, a second preferred embodiment including function units for performing interleaving and deinterleaving processes will be described with reference to figures.

In the second through fifth preferred embodiments, a transmitter I will only be described for ease of description since operations of a receiver II correspond to those of the transmitter I, and many of the operations are repeated, so no corresponding operations will be described.

Figure 2:
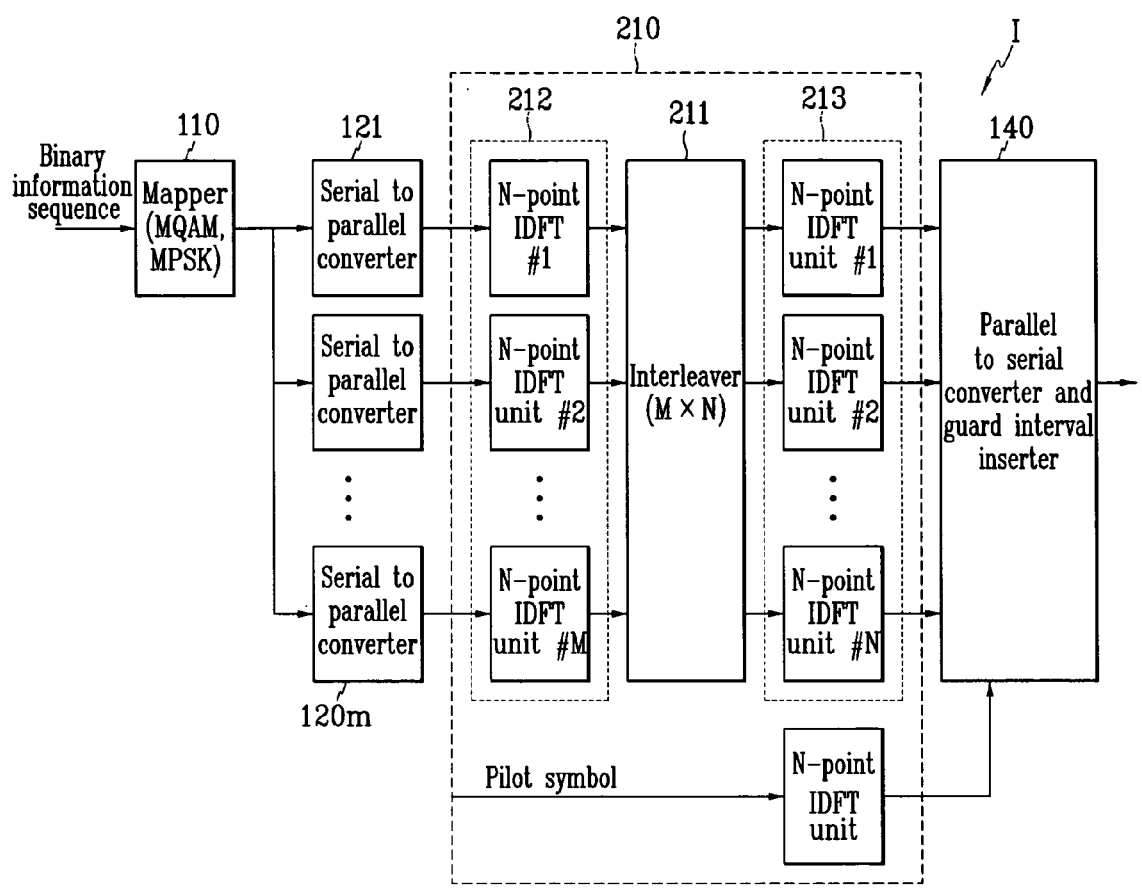
FIG. 2 shows a detailed configuration of a wireless communication system according to a second preferred embodiment of the present invention.
Figure 3:
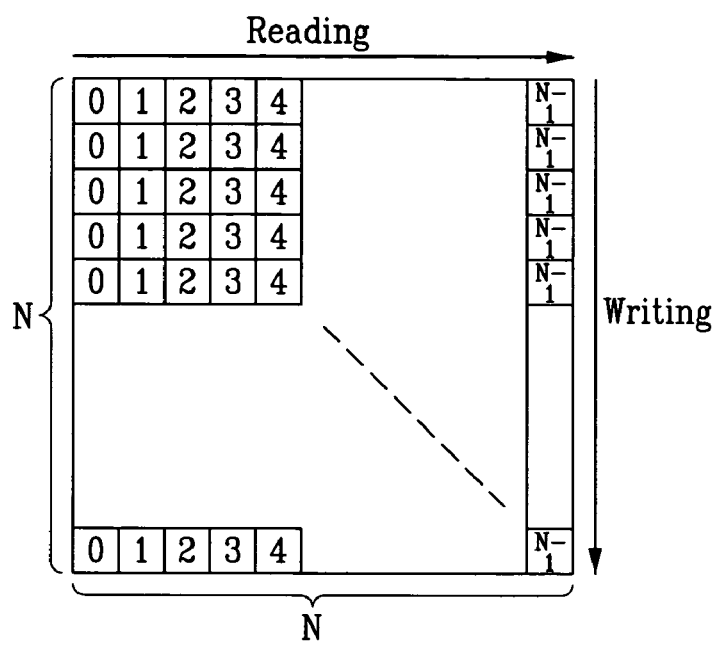
FIG. 3 shows a first configuration of a memory buffer of an interleaver of FIG. 2.
Figure 4:
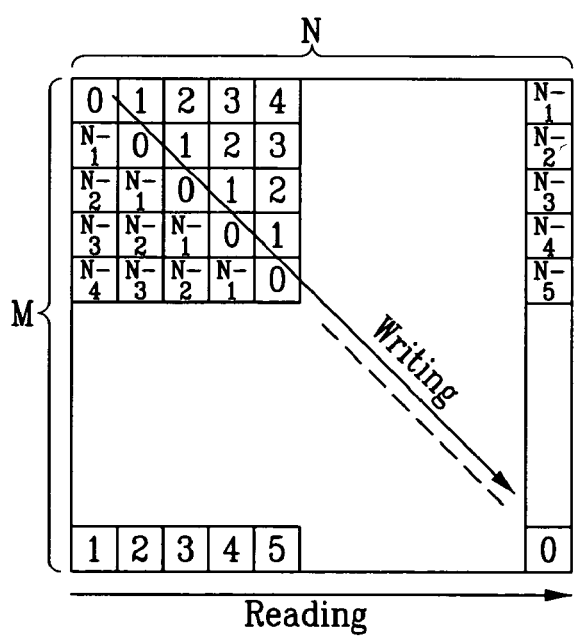
FIG. 4 shows a second configuration of a memory buffer of an interleaver of FIG. 2.

FIG. 2 shows a detailed configuration of a wireless communication system according to a second preferred embodiment of the present invention, FIG. 3 shows a first configuration of a memory buffer of an interleaver of FIG. 2, and FIG. 4 shows a second configuration of a memory buffer of the interleaver of FIG. 2.

As shown in FIG. 2, the transmitter I according to the second preferred embodiment of the present invention has the same configuration as that of the first preferred embodiment except an IDFT unit 210, and the receiver II according to the second preferred embodiment of the present invention has the same configuration as that of the first preferred embodiment except a DFT unit.

In detail, the IDFT unit 210 comprises a mapper 110, serial to parallel converters 121 through 120*m*, a parallel to serial converter and guard interval inserter 140, and an interleaver 211 including M×N memory buffers provided between first and second IDFT units 212 and 213.

When receiving mapped MQAM symbols from the mapper 110 of the transmitter I, the serial to parallel converters 121 through 120*m* sequentially receive the mapped MQAM symbols, and convert them into vector data. Respective m IDFT units of the first N-point IDFT unit 212 receive the vector data, perform IDFT on them, and transmit respective output values to the interleaver 211.

The interleaver 211 writes subchannel values of the output signals received from m IDFT units in the memory buffers in the vertical (or temporal) direction, and when the interleaver 211 finishes writing the subchannel values for N pilot symbol blocks, the second N-point IDFT unit 213 reads the memory buffers in the vertical (or frequency) direction from the written memory buffers. FIG. 3 shows a write and read process into/from the memory buffer.

FIG. 3 shows a first configuration of a memory buffer of the interleaver of FIG. 2.

As shown, the interleaver 211 comprises M×N memory buffers, and numbers provided on the respective buffers represent subchannel values of the output signals received from the m IDFT units. The above-configured interleaver 211 writes the subchannel values of the buffers in the vertical (or temporal) direction so that the second N-point IDFT unit 213 may read channel values with less autocorrelations from among the written subchannels values.

That is, when the processing delay is allowed differing from the first preferred embodiment, the respective subchannels with greater autocorrelations are stored temporarily, sequentially, and from top to bottom, and the subchannels with less autocorrelations from among them are read in the frequency direction, thereby improving the system performance.

The second N-point IDFT unit 213 performs Fourier transform on the read subchannels, and transmits them to the parallel to serial converter and guard interval inserter 140 so that the information transmit vector added with a guard interval may be converted into a serial signal, and be then output.

That is, when the processing delay is allowed in the second preferred embodiment, the total system performance is improved by reading subchannel values with less autocorrelations of a channel and demodulating them with respect to the OFDM signal.

Also, the performance of the wireless communication system according to the second preferred embodiment may be varied according to methods of what direction the interleaver 211 writes the respective subchannels or what direction the second N-point IDFT unit 213 reads them. That is, better performance is obtained by reducing the autocorrelations of the channel multiplied to the information transmit vector through the deinterleaving process of the receiver following the write and read direction.

For example, when the interleaver 211 writes the respective received subchannels in the memory buffers in the diagonal direction, the second N-point IDFT unit 213 reads written channel values in the frequency direction in parallel with the row direction (the horizontal direction). This method obtains better performance compared to the write process in the diagonal direction.

A process for the interleaver 211 and the second N-point IDFT unit 213 to write and read data will now be described with equations.

The distortion signal $H_i(k)$ caused by the frequency selective fading channel in Equation 4 has two-dimensional autocorrelations as given in Equation 10.

$$R_H(a, b) = E[H_i(k)H^*_{i-b}(k-a)] \quad \text{Equation 10}$$

$$= R(0, b) \sum_{l=0}^{\tau_L - 1} \sigma_{\alpha l}^2 e^{-j\frac{2\pi a l}{N}}$$

where $\tau_L$ is a delay time of the L-th path in the multipath channel, and $\sigma_{\alpha l}^2$ is a mean power of an L-th path signal, and the total mean power for each power is normalized to be 1. Therefore, the autocorrelations are influenced in the frequency direction by a delay profile of the fading channel. The term $R(0,b)$ is given as Equation 11.

$$R(0, b) = \frac{1}{N^2} \quad \text{Equation 11}$$

$$\left( N + 2 \sum_{n=1}^{N-1} (N-n) J_0(2\pi(b-1)Nu(b-1) + bN_G + n) f_D T_S \right)$$

where u is a unit step function, and $N_G$ is a guard interval. The autocorrelations are influenced in the frequency direction by the maximum Doppler frequency, a number of subchannels, the guard interval, and the bandwidth $1/T_s$ of the signal. The optimal operation method of the interleaver 211 for improvements of performance can be described through the above description of FIG. 3.

In addition, the write operation is performed on the subchannel values in the diagonal direction as shown in FIG. 4 in the fading channel with a delay profile, and the subchannel values are interleaved in the horizontal direction so that the fading channel may be configured with subchannels with less autocorrelations, thereby achieving better performance.

In the case of a channel without a multipath, that is, in the case of a channel similar to a frequency non-selective channel, the interleaving is performed in the temporal direction to reduce the autocorrelations of the channel caused by the Doppler spreading, and accordingly, the OFDM method generates better performance in the frequency non-selective channel.

As described, the wireless communication system according to the second preferred embodiment not only improves the system performance following the new channel compensation method as described in the first preferred embodiment, but also obtains better performance through interleaving and deinterleaving for less autocorrelations of the channel.

The above-mentioned embodiments are varied or modified in many ways.

For example, the number and the configuration of the IDFT units in the first N-point IDFT unit can be varied, which will now be described with reference to figures.

Figure 5:
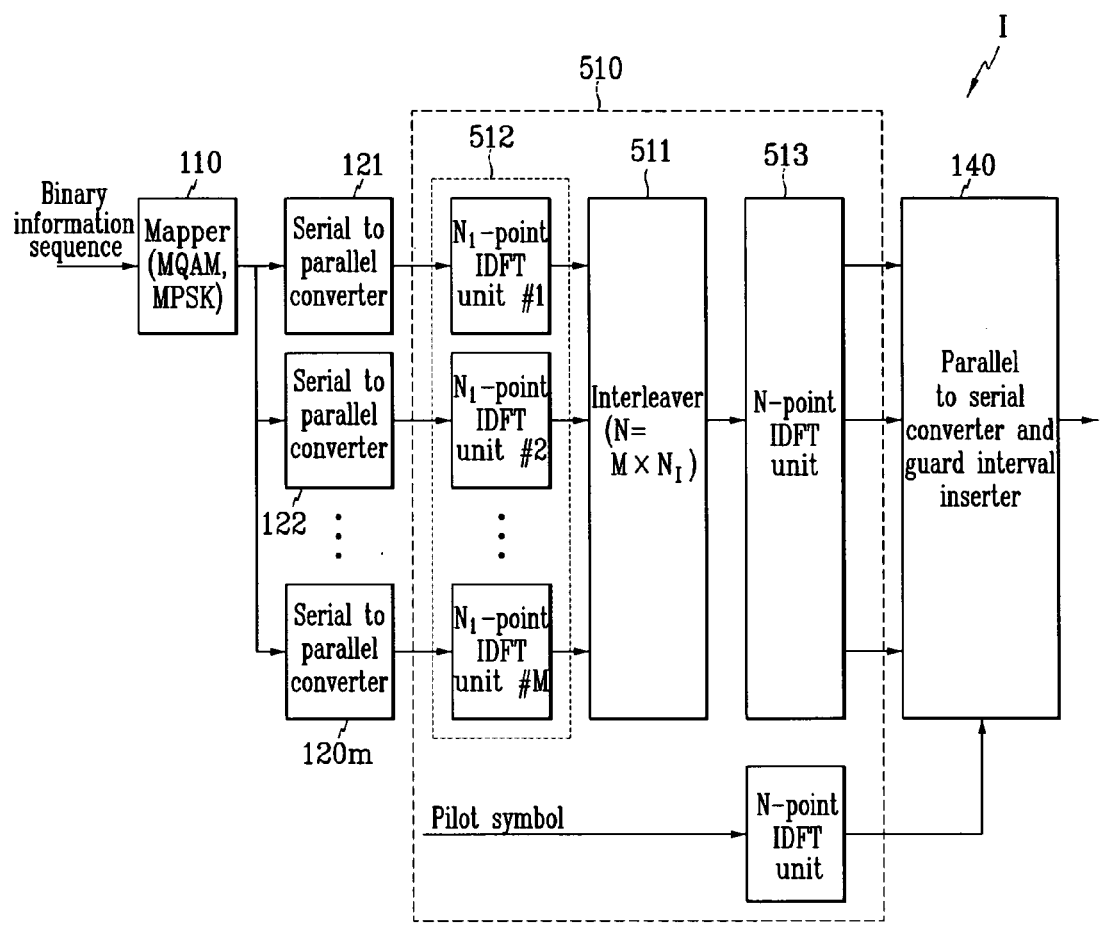
FIG. 5 shows a detailed configuration of a wireless communication system according to a third preferred embodiment of the present invention.
Figure 6:
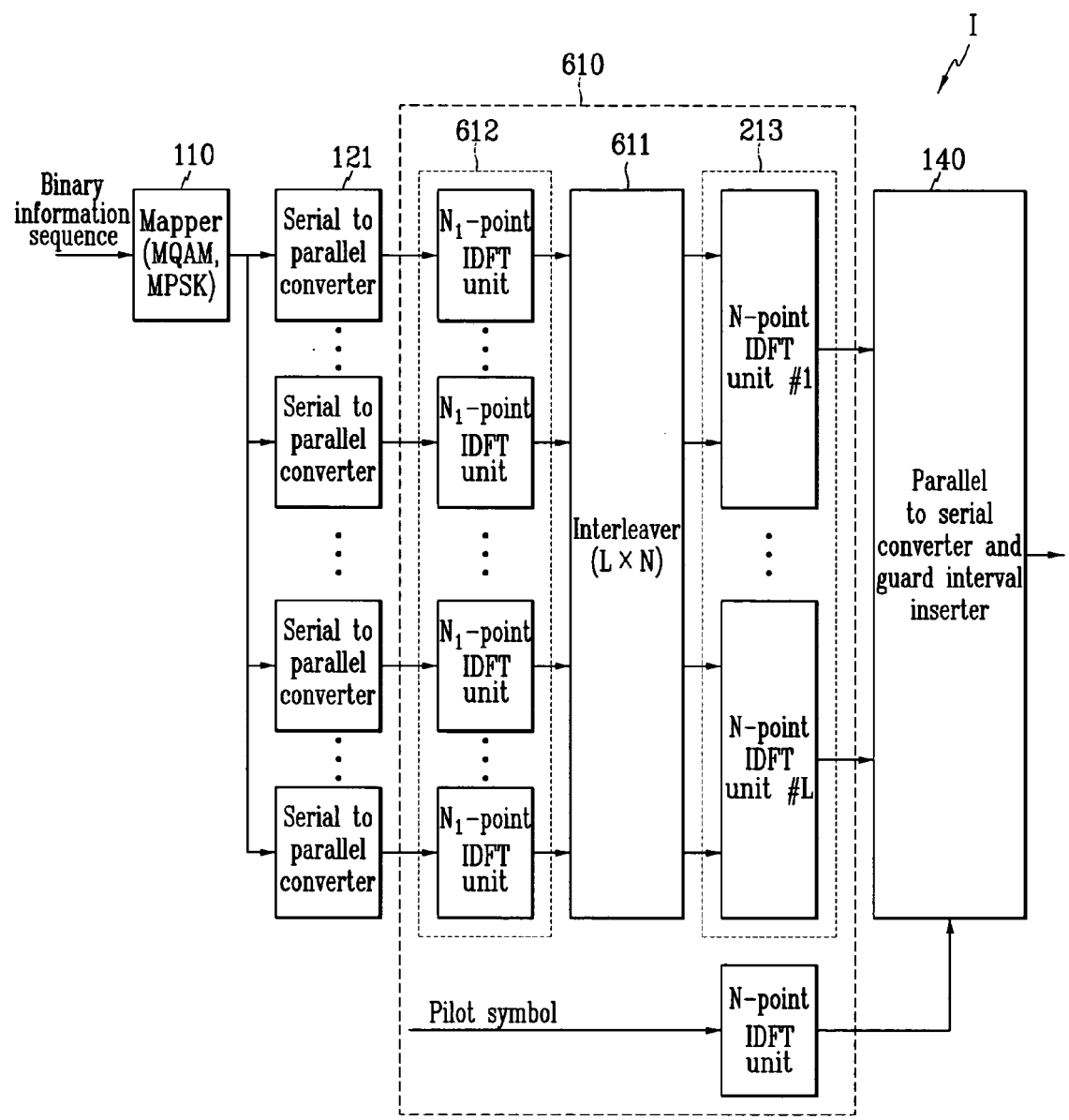
FIG. 6 shows a detailed configuration of a wireless communication system according to a fourth preferred embodiment of the present invention.

FIG. 5 shows a detailed configuration of a wireless communication system according to a third preferred embodiment of the present invention, and FIG. 6 shows a detailed configuration of a wireless communication system according to a fourth preferred embodiment of the present invention.

As shown in FIG. 5, the wireless communication system according to the third preferred embodiment of the present invention has the same configuration as that of the first preferred embodiment except the IDFT unit 510, and has the same configuration as that of the second preferred embodiment except the number (a single number) of the second N-point IDFT units and the configuration of the first $N_1$-point IDFT unit. The receiver II also has the same configuration as that of the first and second preferred embodiments, except the DFT unit.

The wireless communication system according to the third preferred embodiment reduces complexity of realization by reducing calculation including the IDFT and DFT processes, and hence, it requires complex calculation of $(N/2)\log_2 N$ so as to configure the N-point IDFT units as described in the second preferred embodiment.

In order to reduce complex calculation and addition, M $N_1$-point IDFT units are used instead of the N-point IDFT units ($N_1$ is less than N), and respective outputs of the IDFT units are interleaved, thereby improving the system performance and reducing the hardwired complexity by the ratio of $\log_2 N_1 / \log_2 N$ where $N = MN_1$.

The wireless communication system according to the fourth preferred embodiment shown in FIG. 6 has the same configuration as that of the first preferred embodiment except an IDFT unit 610, and it has the same configuration as that of the second preferred embodiment except the number of second N-point IDFT units and the configuration of the first $N_1$-point IDFT units in the IDFT unit 610. The receiver II has the same configuration as those of the first and second preferred embodiments except the DFT unit.

In the same manner of the third embodiment, the wireless communication system according to the fourth preferred embodiment aims at reducing complexity of realization and calculation of the IDFT and the DFT, and it comprises L×M first N1-point IDFT units 612, L second N-point IDFT units 213, and an interleaver 611 including M×L memory buffers provided therebetween.

Figure 8:
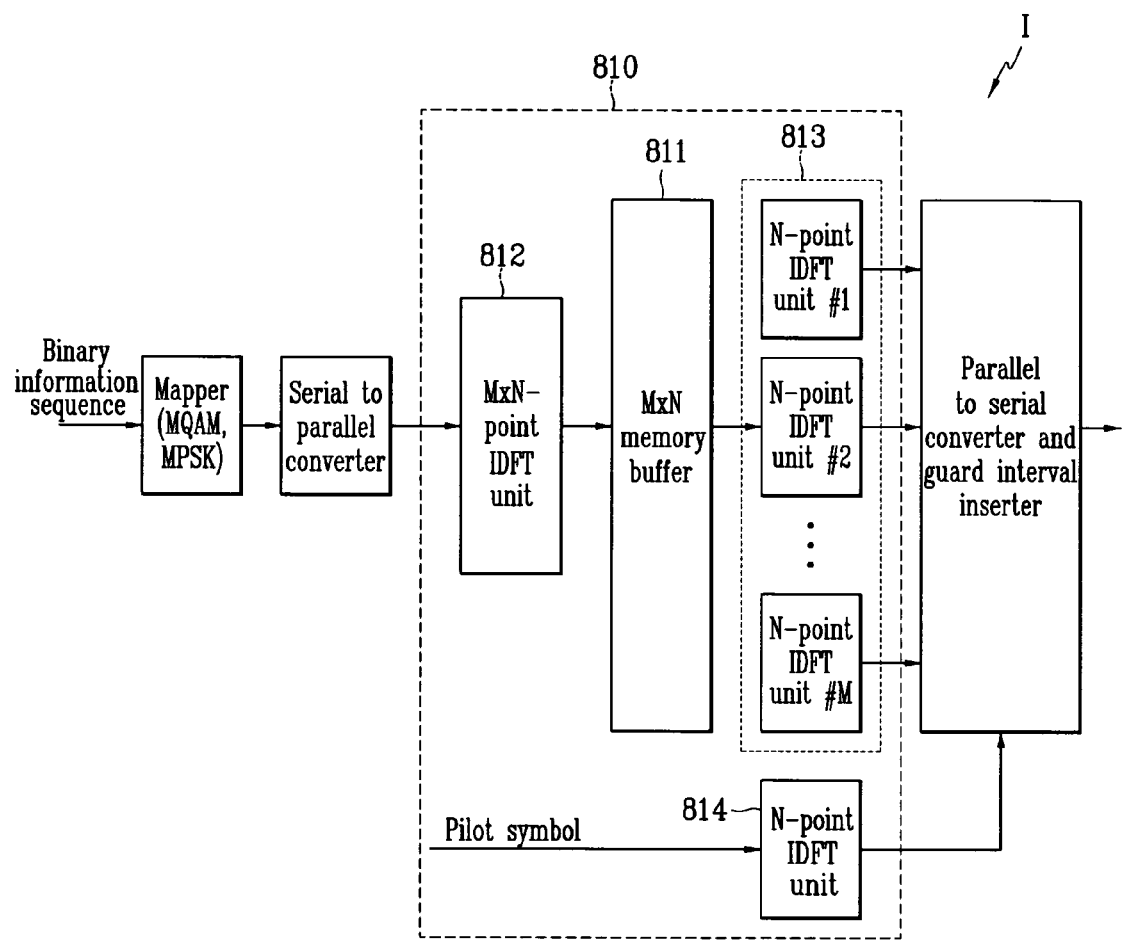
FIG. 8 shows a detailed configuration of a wireless communication system according to a fifth preferred embodiment of the present invention.

FIG. 8 shows a detailed configuration of a wireless communication system (a transmitter) according to a fifth preferred embodiment of the present invention. As shown, the wireless communication system has the same configuration as that of the second embodiment except the IDFT unit 810.

In detail, differing from the second embodiment for using the interleaver 211 with M×N memory buffers to improve its performance, the wireless communication system according to the fifth preferred embodiment uses an M×N-point IDFT unit 812 in the transmitter I, and a DFT unit in the receiver II to thereby improve the performance.

Since an interval for smoothing noise caused by an equalizer in the receiver II increases from the N points to M×N points, its performance is further improved than the interleaving method of FIG. 2. The M×N memory buffer 811 shown in FIG. 8 does not perform the interleaving function.

Figure 9:
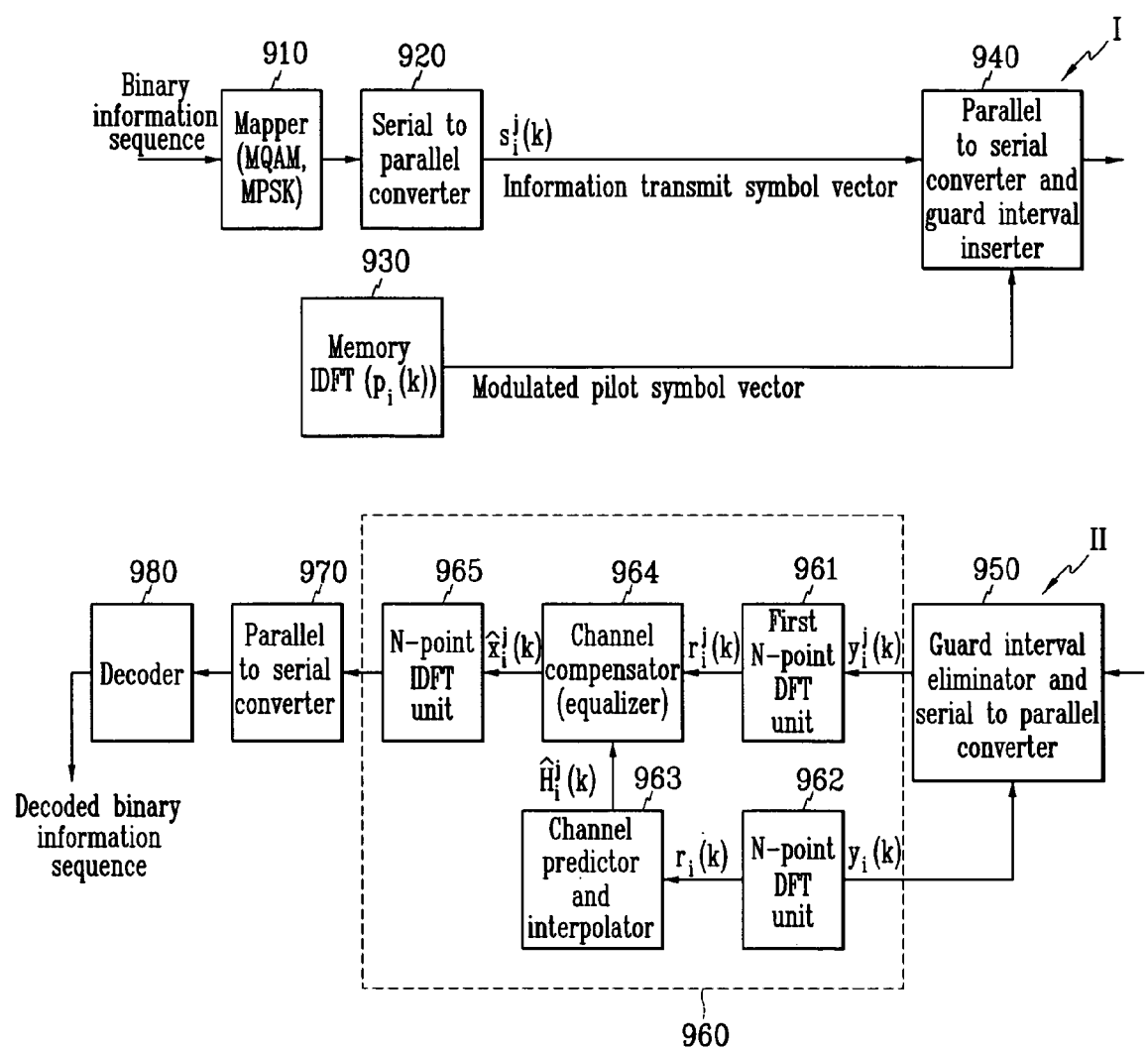
FIG. 9 shows a detailed configuration of a wireless communication system according to a sixth preferred embodiment of the present invention.

FIG. 9 shows a detailed configuration of a wireless communication system according to a sixth preferred embodiment of the present invention.

Compared to the first preferred embodiment of FIG. 1, the receiver II comprises an N-point IDFT unit 965 excluding the first and second N-point DFT units 161 and 165.

Therefore, the wireless communication system according to the sixth preferred embodiment requires no IDFT unit for information transmit symbol vector in the receiver II.

In detail, the transmitter I of the wireless communication system comprises a mapper 910 for converting binary information transmit sequences into MQAM (or MPSK) symbols, a serial to parallel converter 920 for converting the MQAM symbols into vectors, a memory 930 for reading a modulated pilot symbol stored in the memory after IDFT is performed on the pilot symbol with a previously optimized PAR (peak-to-average ratio), and a parallel to serial converter and guard interval inserter 940 for converting the MQAM symbol vectors into parallel signals, inserting a guard interval found by a cyclic extension thereinto, and transmitting them.

The receiver II comprises a guard interval eliminator and serial to parallel converter 950 for eliminating a guard interval from a receive signal and converting serial data into parallel data, a DFT unit 961 for converting information transmit symbol vectors to the frequency domain, a channel predictor and interpolating filter 963 for predicting a channel of the information transmit symbol vector by using a demodulated pilot symbol vector when the DFT unit 962 demodulates the pilot symbol vector, a channel compensator 964 for compensating the channel through an equalizer, an IDFT unit 965 for demodulating the channel-compensated information transmit symbol vector through the IDFT, a parallel to serial converter 970 for converting the demodulated signal into a serial signal, and a decoder 980 for restoring the converted signal into a binary information sequence.

The wireless communication system according to the sixth embodiment reduces hardwired complexity by eliminating the two IDFT units from the transmitter and the receiver differing from the first preferred embodiment.

When the MQAM (or MPSK) symbol vectors are modulated into OFDM signals through the IDFT unit, the amplitude of the modulated signal becomes relatively greater than the mean value, and when the amplitude is given in the PAR parameter format, and the PAR is great, an A/D (analog to digital) converter and a D/A (digital to analog) converter require high dynamic ranges which increase the costs and cause a clipping phenomenon in which a large part of the amplitude is cut off because of the backoff effect of a power amplifier, and the clipping phenomenon generates signal distortion and lowers system performance.

However, since the wireless communication system according to the fifth preferred embodiment uses no IDFT unit, no performance lowering because of the PAR is generated, and effective performance improvements are obtained.

As described, the wireless communication system according to the first through sixth preferred embodiments controls the noise enhancement caused by the channel compensation in an interval with a lesser amplitude of the channel into mean values within a symbol interval to reduce error rates and improve system performance.

In addition, the wireless communication system performs interleaving and deinterleaving so as to lessen the autocorrelations of the channel at the time of compensating the channel, and restores them, thereby achieving better performance.

The OFDM-based wireless communication system and the channel compensation method reduces error rates in the interval with a lesser channel amplitude to improve the total system performance, obtain data rates twice faster than the conventional data rates, and achieve twice the economy with the same frequency.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In a wireless communication system for transmitting and receiving data by using a multipath fading channel, an OFDM (orthogonal frequency division multiplexing) wireless communication system comprising:

a transmitter for performing IDFT (inverse discrete Fourier transform) on information transmit vectors at least twice to modulate them into an OFDM (orthogonal frequency division multiplexing) signals, transmitting the modulated OFDM signals through a multipath fading channel, modulating a pilot symbol vector for predicting an amplitude and a phase of the multipath fading channel into an OFDM signal, and transmitting the modulated OFDM signal through the multipath fading channel; and a receiver for demodulating the pilot symbol vector received through the multipath fading channel to predict the amplitude and the phase of the multipath fading channel, using the predicted amplitude and phase to compensate the amplitude and the phase multiplied to the received information transmit vectors, performing DFT (discrete Fourier transform) on the compensated information transmit vectors to average a noise signal value increased by the channel compensation in a specific interval with an amplitude of the channel with less than a mean value into a mean value within an OFDM symbol interval, and outputting the mean value, wherein the transmitter comprises a first IDFT unit for performing IDFT on the information transmit vectors and outputting IDFT-performed signals; and a second IDFT unit for performing IDFT on the IDFT-performed signals output from the first IDFT unit to modulate them into OFDM signals, and wherein the receiver comprises a first DFT unit for demodulating the received information transmit vectors into OFDM signals; and a second DFT unit for performing DFT on the compensated information transmit vectors and averaging a noise signal value which becomes enhanced in a specific interval with an amplitude of the channel with less than a mean value, to a mean value within a symbol interval.

2. The OFDM wireless communication system of claim 1, wherein the transmitter comprises:

a mapper for mapping an externally received binary information sequence to symbols according to the MQAM (M-ary quadrature amplitude modulation) method;

a serial to parallel converter for converting the mapped symbols into vector data that are information transmit vectors and outputting the information transmit vectors to the first IDFT;

a third IDFT unit for modulating a pilot symbol vector for predicting the amplitude and phase of the multipath fading channel into an OFDM signal; and a parallel to serial converter and guard interval inserter for inserting a guard interval into the signals received from the second IDFT unit, converting the guard interval inserted information transmit vectors into a serial signal and transmitting it, and converting the guard interval inserted pilot symbol vector into a serial signals and transmitting it.

3. The OFDM wireless communication system of claim 2, wherein the receiver comprises:

a guard interval eliminator and serial to parallel converter for eliminating the guard interval from the converted and received serial signal, and converting the guard interval eliminated serial signal into an information transmit vector and a pilot symbol vector respectively;

a third DFT unit for demodulating the converted pilot symbol vector into an OFDM signal;

a channel predictor and interpolator for predicting the amplitude and phase of the multipath fading channel using the demodulated pilot symbol vector;

a channel compensator for compensating the amplitude and phase of the channel multiplied to the demodulated information transmit vector according to the predicted amplitude and phase of the channel;

a parallel to serial converter for converting the signal received from the second DFT unit into serial signals; and a decoder for restoring the converted serial signals into a binary information sequence, and outputting the binary information sequence.

4. The OFDM wireless communication system of claim 2, wherein the channel compensator compensates the amplitude and phase of the channel through the MMSE (minimum mean square error) equalization method using the predicted amplitude and phase of the channel, and the MMSE equalization method satisfies the equation:

$$\hat{x}_i^j(k) = \frac{r_i^j(k)\hat{H}_i^{j*}(k)}{\left|\hat{H}_i^{j*}(k)\right|^2 + \sigma_w^2/\sigma_x^2 + \sigma_I^2}$$

here $\hat{H}_i^{j*}(k)$ is the predicted amplitude and phase of the channel, $\sigma_w^2$ and $\sigma_x^2$ are mean power values of the OFDM signals and an AWGN (additive white Gaussian noise) signal, and $\sigma_I^2$ is a mean power value of an ICI (interchannel interference) signal.

5. The OFDM wireless communication system of claim 4, wherein the channel compensator compensates the amplitude and phase of the channel through the ZF (zero forcing) equalization method using the predicted amplitude and phase of the channel, and the ZF equalization method satisfies the equation:

$$\hat{x}_i^j(k) = \frac{r_i^j(k)\hat{H}_i^{j*}(k)}{\left|\hat{H}_i^{j*}(k)\right|^2}.$$

6. The OFDM wireless communication system of claim 4, wherein the channel compensator compensates the amplitude and phase of the channel through a gain limit equalization method using the predicted amplitude and phase of the channel, and the gain limit equalization method satisfies the equation:

$$\hat{x}_i^j(k) = \frac{r_i^j(k)\hat{H}_i^{j*}(k)}{\left|\hat{H}_i^{j*}(k)\right|^2 + \sigma}$$

where $\sigma$ is a constant used for gain limits.

7. A wireless communication system including a transmitter for transmitting data using a multipath fading channel and a receiver for receiving them from the transmitter, comprising:

a mapper for mapping an externally received binary information sequence to at least one symbol according to the MQAM (M-ary quadrature amplitude modulation) method;

a serial to parallel converter for converting the mapped symbols into vector data which are information transmit vectors;

a first IDFT (inverse discrete Fourier transform) unit including m IDFT units for performing IDFT on the converted information transmit vectors;

an interleaver for writing subchannel values of the respective transmit vectors received from the IDFT unit in an mxn memory buffer in the first direction;

a second IDFT unit including n IDFT units for reading the subchannel values written in the first direction in the second direction when the writing in the first direction is finished, performing IDFT on the read subchannel values, and modulating them to OFDM (orthogonal frequency division multiplexing) signals;

a third IDFT unit for modulating a pilot symbol vector for predicting an amplitude and a phase of the multipath fading channel to an OFDM signal; and a parallel to serial converter and guard interval inserter for inserting a guard interval into the signal received from the second IDFT unit, converting the guard interval inserted information transmit vector into a serial signal, transmitting the serial signal, converting the guard interval inserted pilot symbol vector into a serial signal, and transmitting it to the transmitter.

8. A method for compensating a channel in a wireless communication system for transmitting and receiving data using a multipath fading channel, comprising:

(a) performing IDFT (inverse discrete Fourier transform) on information transmission vectors at least twice to modulate the vectors into OFDM (orthogonal frequency division multiplexing) signals, and transmitting the modulated signal through the multipath fading channel;

(b) modulating a pilot symbol vector for predicting an amplitude and a phase of the multipath fading channel into an OFDM signal, and transmitting the modulated signal through the multipath fading channel;

(c) demodulating the pilot symbol vector received through the multipath fading channel to predict the amplitude and the phase of the multipath fading channel;

(d) compensating the amplitude and the phase of the channel multiplied to the received information transmit vectors by using the predicted amplitude and the phase of the channel; and (e) performing DFT on the compensated channel signals, averaging a noise signal value enhanced by the channel compensation in a specific interval with an amplitude of the channel with less than a mean value into a mean value within an OFDM symbol interval, and outputting the mean value, wherein (a) comprises performing a first IDFT on the information transmit vectors and outputting IDFT-performed signals; and performing a second IDET on the IDFT-performed signals to modulate them into OFDM signals, and wherein (d) comprises performing a first DFT for demodulating the received information transmit vectors into OFDM signals; and performing a second DFT on the compensated information transmit vectors and averaging a noise signal value which becomes enhanced in a specific interval with an amplitude of the channel with less than a mean value, to a mean value within a symbol interval.

9. The method of claim 8, wherein (e) comprises using the MMSE (minimum mean square error) equalization method to compensate the amplitude and the phase of the channel multiplied to the received transmit vectors.

10. The method of claim 8, wherein (e) comprises using the ZF (zero forcing) equalization method to compensate the amplitude and the phase of the channel multiplied to the received transmit vectors.

11. The method of claim 8, wherein (e) comprises using the gain limit equalization method to compensate the amplitude and the phase of the channel multiplied to the received transmit vectors.

* * * * *

UNITED STATES PATENT AND TRADEMARK OFFICE
CERTIFICATE OF CORRECTION

| | |
|---|---|
| PATENT NO. | : 7,548,522 B2 |
| APPLICATION NO. | : 10/720701 |
| DATED | : June 16, 2009 |
| INVENTOR(S) | : Jwa |

It is certified that error appears in the above-identified patent and that said Letters Patent is hereby corrected as shown below:

<u>Column 15,</u>

Line 3, "IDET" should read --IDFT--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,548,522 B2  Page 1 of 1
APPLICATION NO. : 10/720701
DATED : June 16, 2009
INVENTOR(S) : Jwa It is certified that error appears in the above-identified patent and that said Letters Patent is hereby corrected as shown below:

Title page

"(73) Assignee: KTFreetel Co., Ltd., Seoul (KR)" should read

--(73) Assignees: KTFreetel Co., Ltd., Seoul (KR); Jeong-Woo Jwa, Jeju (KR)--.

Signed and Sealed this

Fourteenth Day of December, 2010

David J. Kappos
*Director of the United States Patent and Trademark Office*